(12) United States Patent
Kurtz et al.

(10) Patent No.: US 12,147,079 B2
(45) Date of Patent: Nov. 19, 2024

(54) LENS PLATE FOR FERRULES

(71) Applicant: US Conec, Ltd, Hickory, NC (US)

(72) Inventors: Daniel D. Kurtz, Huntersville, NC (US); Darrell R. Childers, Hickory, NC (US); Sherri Reed, Charlotte, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 16/857,868

(22) Filed: Apr. 24, 2020

(65) Prior Publication Data

US 2020/0341199 A1 Oct. 29, 2020

Related U.S. Application Data

(60) Provisional application No. 62/837,834, filed on Apr. 24, 2019.

(51) Int. Cl.
*G02B 6/32* (2006.01)
*G02B 6/38* (2006.01)

(52) U.S. Cl.
CPC ........... *G02B 6/322* (2013.01); *G02B 6/3825* (2013.01); *G02B 6/3882* (2013.01)

(58) Field of Classification Search
CPC .... G02B 6/322; G02B 6/3882; G02B 6/3825; G02B 6/32; G02B 6/3885
See application file for complete search history.

(56) References Cited

U.S. PATENT DOCUMENTS

| | | | | |
|---|---|---|---|---|
| 7,295,727 | B1 * | 11/2007 | Thorson | G02B 6/3582 385/18 |
| 9,011,020 | B2 * | 4/2015 | Ty Tan | G02B 6/30 385/53 |
| 9,465,170 | B1 * | 10/2016 | Childers | G02B 6/32 |
| 9,529,155 | B2 | 12/2016 | Bhagavatula et al. | |
| 9,563,027 | B2 | 2/2017 | Childers et al. | |
| 9,588,302 | B2 | 3/2017 | Grinderslev | |
| 9,739,948 | B2 * | 8/2017 | Watanabe | G02B 6/382 |
| 9,983,365 | B2 | 5/2018 | Childers | |
| 10,094,994 | B2 | 10/2018 | Leigh et al. | |
| 10,191,218 | B2 * | 1/2019 | Wada | G02B 6/3845 |

(Continued)

FOREIGN PATENT DOCUMENTS

| | | |
|---|---|---|
| EP | 3451033 A1 | 3/2019 |
| EP | 3499284 A1 | 6/2019 |

(Continued)

*Primary Examiner* — Ryan A Lepisto
*Assistant Examiner* — Erin D Chiem
(74) *Attorney, Agent, or Firm* — Michael L Leetzow PLLC; Shubhrangshu Sengupta

(57) ABSTRACT

A lens plate for fiber-optic ferrules has an inner side and an outer side. The inner side of the lens plate has a plurality of lenses on an inner base in an inner central recessed portion of the inner side, the inner side facing an end face of the fiber-optic ferrule. The plurality of lenses are configured to collimate an optical beam received thereupon. There is an outer base in an outer central recessed portion on the outer side and at least partially circumscribed by an outer face, the inner central recessed portion and the outer central recessed portion at least partially overlie one another. There is also a method for collimating an optical beam output from a fiber-optic ferrule end face using a lens plate.

16 Claims, 12 Drawing Sheets

(56) References Cited

U.S. PATENT DOCUMENTS

| | | | |
|---|---|---|---|
| 10,620,387 B2 | 4/2020 | Bushnell et al. | |
| 2015/0104135 A1* | 4/2015 | Bushnell | G02B 6/325 |
| | | | 385/79 |
| 2015/0370017 A1* | 12/2015 | Moriyama | G02B 6/3882 |
| | | | 385/78 |
| 2016/0161682 A1* | 6/2016 | Nishimura | B25B 27/00 |
| | | | 385/134 |
| 2018/0239092 A1 | 8/2018 | Childers et al. | |
| 2018/0314012 A1 | 11/2018 | Gsell et al. | |
| 2020/0088954 A1 | 3/2020 | Nakama et al. | |
| 2020/0103597 A1 | 4/2020 | Watanabe et al. | |
| 2020/0363595 A1 | 11/2020 | Grann et al. | |

FOREIGN PATENT DOCUMENTS

| | | | | |
|---|---|---|---|---|
| EP | 3525020 A1 | 8/2019 | | |
| JP | 2019533836 A * | 11/2019 | | |
| WO | WO-2018089286 A1 * | 5/2018 | | G02B 6/32 |
| WO | 2018116855 A1 | 6/2018 | | |
| WO | 2020105258 A1 | 5/2020 | | |

* cited by examiner

LENS PLATE FOR FERRULES

REFERENCE TO RELATED CASE

This application claims priority under 35 U.S.C. § 119 (e) to provisional application No. 62/837,834 filed on Apr. 24, 2019, the contents of which are hereby incorporated by reference in their entirety.

BACKGROUND OF THE INVENTION

Managing optical output from a fiber-optic ferrule to precisely mate with another fiber-optic ferrule is necessary to prevent excessive divergence of the output beam or back reflection. One current technique to address beam divergence is to place lenses on the exterior of the ferrule end face. An example of such a technique is discussed in European Patent Pub. No. EP 3451033A1 and US Pat. Pub. No. 2018/0314012. These lenses are external in the sense that they modify an optical beam at an exit/entry point in the ferrule. Alternatively, lens surface negatives may be part of the mold itself, in which case lenses are molded integrally as part of the ferrule end face and are therefore, externally positioned on the ferrule end-face. See, e.g., U.S. Pat. Nos. 9,563,027 and 9,465,170 owned by the Applicant. As another alternative, molding may be carried out internal to the ferrule such that one or more prescriptioned lens surfaces are inside the ferrule, thereby creating internally molded lenses.

Certain internal lens designs for fiber-optic ferrules have been proposed, for example, in Applicant's US Pat. Pub. No. 2018/0239092 and Applicant's U.S. Pat. No. 9,983,365. The internal lenses in these designs are integrally molded.

Molding a lens as a separate, external part of the fiber-optic ferrule is prone to tolerance errors, where lens to fiber pitch is critical. The fact that the fiber-optic ferrule has an extra part—the external lens—increases manufacturing costs. Externally-lensed fiber-optic ferrules may be relatively more susceptible to moisture on the end face, and may be slightly harder to clean than non-lensed ferrules.

Currently, integrally molded lenses external to the ferrule (i.e., one-piece external lensed ferrule) are difficult to make in terms of lens to fiber alignment due to a moving lens core.

Further, as the number of optical fibers increases and the fiber size decreases, internally-lensed ferrules are challenging, but not impossible, either with individual molding pins due to a sharper lens or due to maintaining a rigid core structure.

Thus, there is a need to collimate and manage optical output from a fiber-optic ferrule to precisely mate with optical features of the mating fiber-optic ferrule, without excessive divergence of the output beam or back reflection or the other issues previously noted. The inventive lens plate according to the present invention provides one solution thereto.

SUMMARY OF THE INVENTION

The present invention is directed to lens plate for a fiber-optic ferrule that includes a main body having an outer side and an inner side, the outer side configured to mate with another lens plate or another ferrule, and the inner side having a plurality of lenses on an inner base in an inner central recessed portion of the inner side, the inner side facing an end face of the fiber-optic ferrule, wherein at least one of the plurality of lenses are configured to collimate an optical beam received thereupon.

In some embodiments, the inner side has an inner face at least partially circumscribing the inner central recessed portion.

In some embodiments, there is also a standoff member extending from the inner face for engagement with the end face of the fiber-optic ferrule.

In some embodiments, there is also an outer base in an outer central recessed portion on the outer side and at least partially circumscribed by an outer face, the inner central recessed portion and the outer central recessed portion at least partially overlie one another.

In other embodiments, each of the plurality of lenses have prescription and the prescription of at least one of the plurality of lenses is different from the other of the plurality of lenses.

In yet another aspect, the invention is directed to a combination of a ferrule and a lens plate that includes a fiber optic ferrule having an end face through which at least one optical beam passes, and a lens plate attached to the end face via a cured adhesive, the lens plate having an inner side facing the end face of the fiber-optic ferrule, the inner face having a plurality of collimating lenses on an inner base in an inner central recessed portion of the inner side.

In some embodiments, wherein the inner side has an inner face at least partially circumscribing the inner central recessed portion and further comprising a further comprising a standoff member extending from the inner face for engagement with the end face of the fiber-optic ferrule.

In other embodiments, the inner side has an inner face at least partially circumscribing the inner central recessed portion and further comprising a further comprising a standoff member extending from the inner face for engagement with the end face of the fiber-optic ferrule.

In yet another aspect, the present invention is directed to a method of collimating an optical beam output from a fiber-optic ferrule end face that includes applying an adhesive to at least one of a lens plate and the fiber-optic ferrule end face, the lens plate having an inner side having a plurality of lenses in an inner central recessed portion facing the fiber-optic ferrule end face, aligning the lens plate with ends of optical fibers at the fiber-optic ferrule end face, and curing the adhesive to attach the lens plate to the fiber-optic ferule end face, wherein the optical output beam is collimated upon exit from an outer side of the lens plate.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
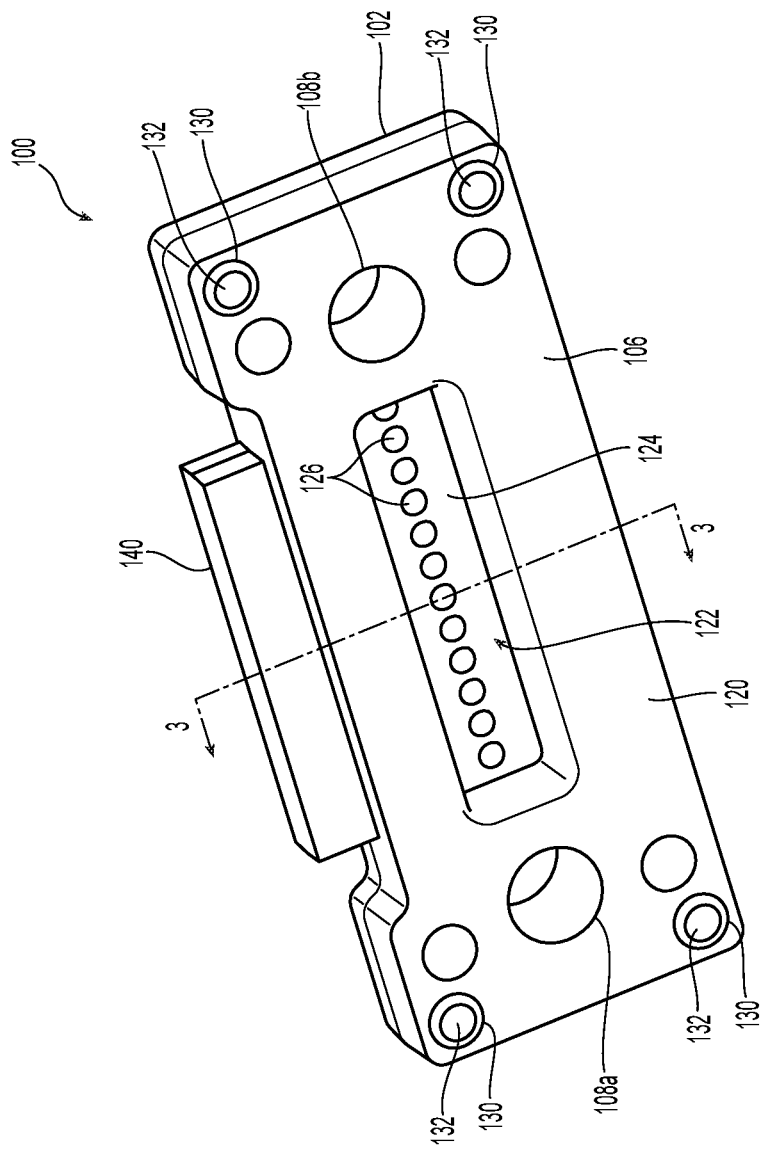
FIG. 1 is a perspective view of an inner side of one embodiment of a lens plate according to the present invention.
Figure 2:
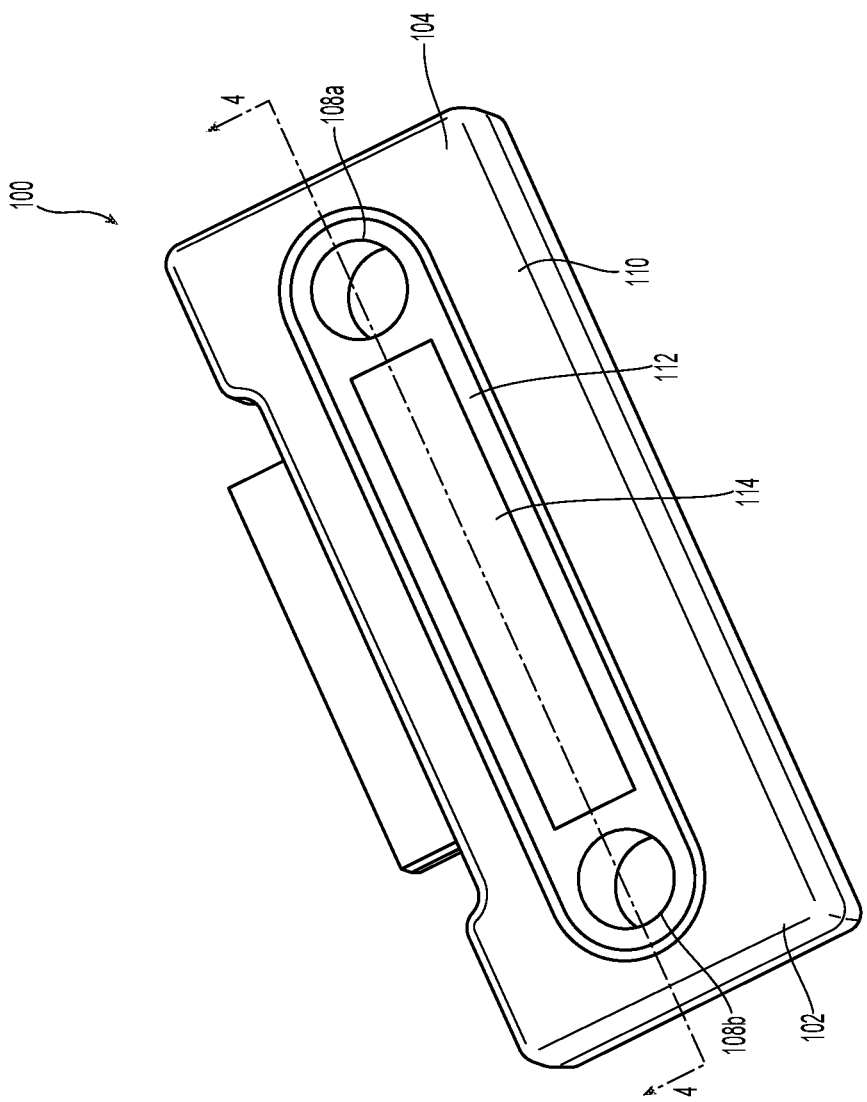
FIG. 2 is a perspective view of an outer side of the lens plate in FIG. 1.
Figure 3:
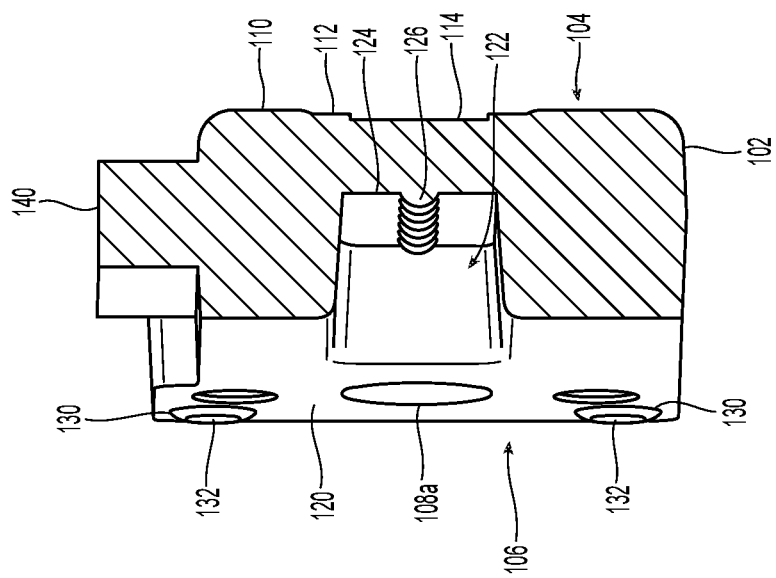
FIG. 3 is a cross sectional view of the lens plate along the line 3-3 in FIG. 1.
Figure 4:
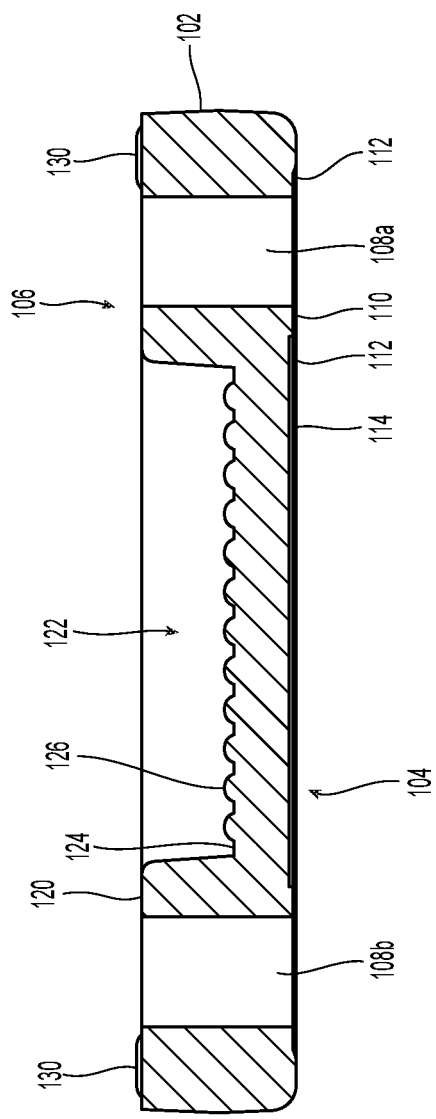
FIG. 4 is a cross sectional view of the lens plate along the line 4-4 in FIG. 2.

Reference will now be made in detail to the present preferred embodiment(s) of the invention, examples of which are illustrated in the accompanying drawings. Whenever possible, the same reference numerals will be used throughout the drawings to refer to the same or like parts.

FIGS. 1-4 illustrate one embodiment of a lens plate 100 according to the present invention. The lens plate 100 has a main body 102 having an outer side 104 (FIG. 2) and an inner side 106 (FIG. 1). The main body 102 has two guide pin openings 108a, 108b, but may have only one or even none. The outer side 104 is configured to mate with another lens plate (like the present invention as illustrated in FIGS. 7-10) or with another fiber optic ferrule that may have a number configuration of lenses (such as internal, external, or none). The outer side 104 has an outer face 110 that circumscribes an outer central recessed portion 112. The outer face 110 is illustrated as completely circumscribing the entirety of the outer central recessed portion 112, but the outer face 110 may circumscribe less than the whole outer central recessed portion 112. In fact, there could be multiple breaks in the outer face 110 and there may be portions of the outer face 110 that are not contiguous with other portions of the outer face 100. The outer side 104 also has an outer base 114 that is contained within the outer central recessed portion 112. As described in more detail below, the optical beams passing between fiber-optic ferrules will pass through the outer base 114. The outer central recessed portion 112 may also include the two guide pin openings 108a, 108b, but the outer central recessed portion 112 may be smaller (and the outer face 110 be larger) so that the two guide pin openings 108a, 108b exit through the outer face 110. The outer central recessed portion 112 is preferably about 50 microns—meaning that when two of the lens plates 100 are mated there is about 100 microns between the exit surfaces of each of the lens plates 100. This distance allows for the application of an anti-reflective (AR) coating on the outer surface (or a part of the outer surface) and for the AR coating to work as desired.

The inner side 106 is configured to face and engage the fiber-optic ferrule. See FIGS. 5-7. The inner side 106 has an inner face 120 that at least partially circumscribes an inner central recessed portion 122 of the inner side 106. The inner face 120 may circumscribe less than the whole inner central recessed portion 122. In fact, there could be multiple breaks in the inner face 120 and there may be portions of the inner face 120 that are not contiguous with other portions of the inner face 120. Within the inner central recessed portion 122 is an inner base 124 that includes a plurality of lenses 126. Each lens in the plurality of lenses 126 has a prescription. The prescription of each of the plurality of lenses 126 may be the same or there may be intentional predetermined variations between each of the lenses in the plurality of lenses 126. However, the prescriptions generally cause the light beam passing through to be collimated between fiber optic ferrules. For example, as a light beam leaves an optical fiber, it is an expanding beam. As the light passes through one of the plurality of lenses, it is collimated until it encounters a lens on the other (mated) fiber-optic ferrule. The collimated light beam is then focused on the optical fiber in the mated fiber-optic ferrule. The same beam manipulation occurs regardless of the direction the beam takes as it travels between fiber-optic ferrules. The depth of the inner central recessed portion 122 of the inner side 106 will depend on the specific use, the optical fibers, the fiber optic ferrules and other considerations. However, the goal is to have a collimated beam leave the lenses for receipt on the other side of a fiber optic junction.

The inner side 106 may be associated with the fiber-optic ferrule end face with the inner face 120. The inner face 120 may directly engage the fiber-optic ferrule end face or there may be standoff members 130 that extend from the inner face 120 to engage the fiber-optic ferrule end face. Naturally, the lens plate 100 would be adhered to the fiber-optic ferrule end face in any appropriate fashion, e.g., adhesives, welding, etc. The faces 132 of the standoff members 130 are more easily fabricated in a single plane than the entirety of the inner face 120. There is also a lower likelihood of debris affecting the positioning of the lens plate 100 relative to the fiber-optic ferrule with the standoff members 130. The standoff members 130 also allow a space for adhesives to fit between the fiber-optic ferrule end face and the inner face 120. It should also be noted that there may be similar standoff members on the outer face of the lens plate 100 to engage another lens plate or with another fiber-optic ferrule end face.

There may be a tab 140 that is at the top edge of the lens plate 100. The tab 140 may aid in the handling of the lens plate 100 before, during, or after attachment to the fiber-optic ferrule end face.

Figure 5:
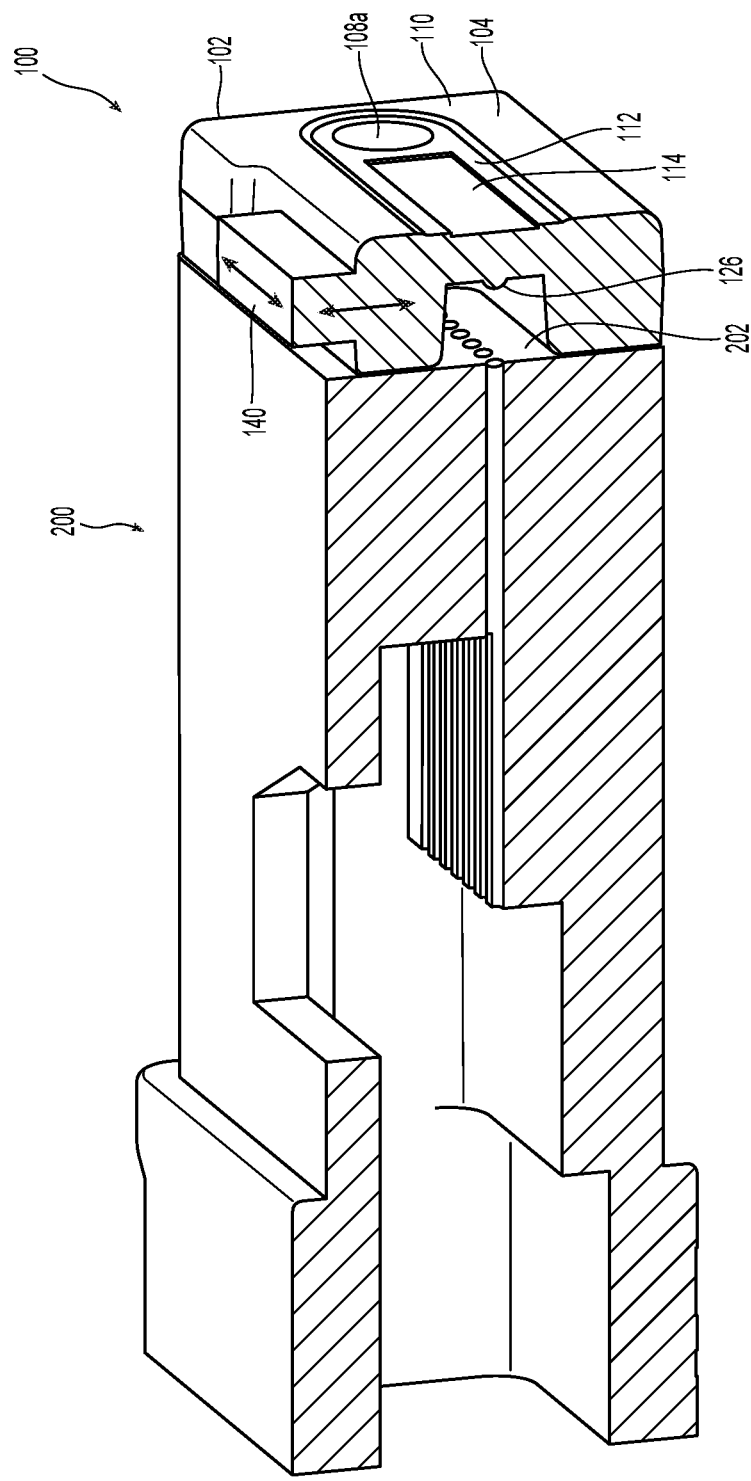
FIG. 5 is a cross sectional view of one embodiment of fiber-optic ferrule with the lens plate in FIG. 1.
Figure 6:
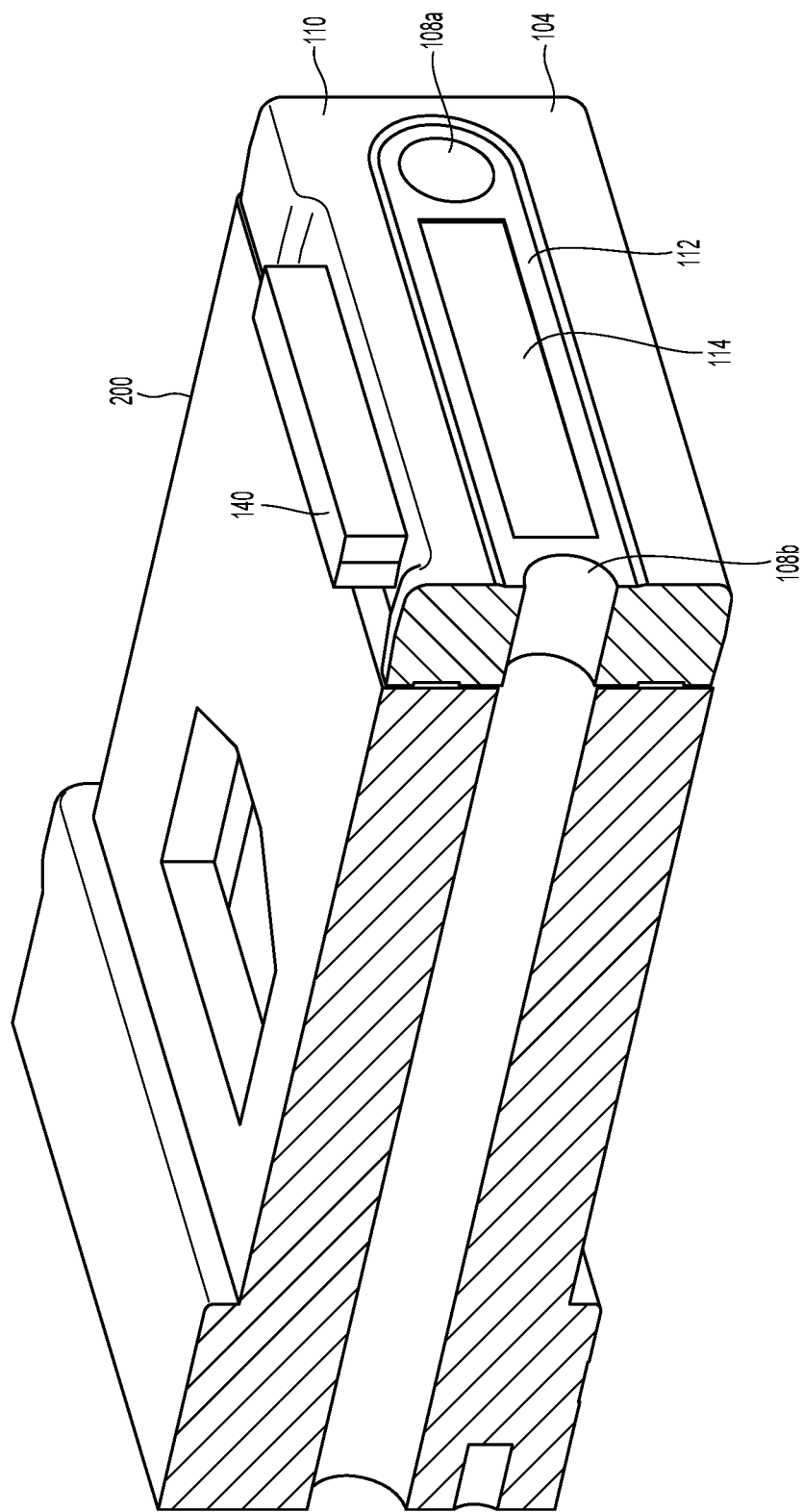
FIG. 6 is a cross sectional view of the fiber-optic ferrule and the lens plate in FIG. 5 through a guide pin hole in each of the lens plate and the fiber-optic ferrule.
Figure 7:
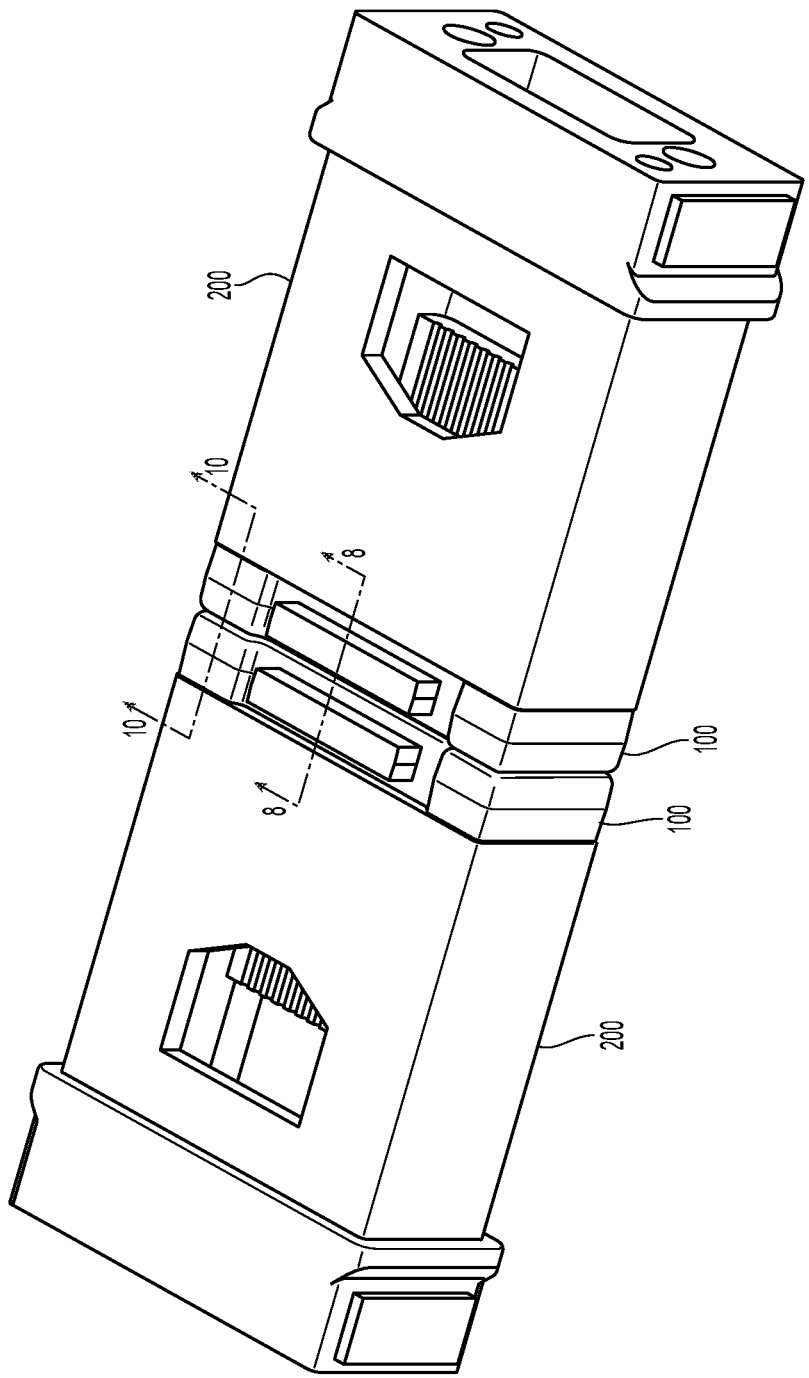
FIG. 7 is a perspective view of two fiber-optic ferrules and two lens plates of FIG. 1 in a mating position.

Attaching the lens plate 100 to a fiber optic ferrule 200, and its end face 202, will be described with reference to FIGS. 5 and 6. The lens plate 100 may be attached to the end face 202 either with active or passive alignment. With active alignment, optical fibers are secured within the fiber optic ferrule 200 by known processes and procedures. An adhesive is then applied to the inner side 106 of the lens plate 100. If there are standoff members 130 on the inner side 106, the epoxy should fill the entire space between the inner side 106 and the end face 202 (it would therefore be the same as the length of the standoff members). The adhesive is preferably as epoxy with an index as close to the optical fiber core as possible. Alternatively, the adhesive may be applied to the end face 202, or both the end face 202 and the inner side 106. For active alignment, the lens plate 100 then can be moved around (e.g., for example by use of the tab 104) until the lens to fiber core alignment is optimized. This is indicated by one or more of several methods of measuring the light, including measuring the beam properties of the beam exiting the lens plate, measuring the insertion loss of the light when coupled into a mating fiber optic ferrule, or measuring the back reflection that is coupled back into the optical fiber while a mirror is placed in front of the lens plate. See FIG. 5 and the arrows indicating the movement of the lens plate 100 relative to the fiber optic ferrule 200, although such movement may be in other non-Cartesian or non-planar directions too (e.g., circular, elliptical, etc.) until the lens plate 100 is in an optimal positioning with respect to the end face 202 for maximum optical output for active alignment. The epoxy is then cured by UV light or in an appropriate oven. Subsequently, depending upon the application the setup of FIGS. 5 and 6 is used in, the ferrule and the lens tab may be connectorized, i.e., one or more housings or other standard connector components added around the ferrule 200. The lens plate 100 may or may not be included as part of any such connector housing.

Turning to FIG. 6, the fiber optic ferrule 200 has guide pin openings 204 (one is illustrated and there is a second one on the opposite side of the fiber optic ferrule 200). Epoxy is applied to the inner side 106 of the lens plate 100. The lens plate 100 is aligned with the end face 202 with a guide pin (not shown) that can be inserted into the guide pin opening 204 and the guide pin openings 108*a*, 108*b*. The epoxy is then cured as noted above and the guide pins can then be removed. Additionally, other passive alignment structures could be used to align the lens plate 100 with the fiber optic ferrule 200.

Figure 8:
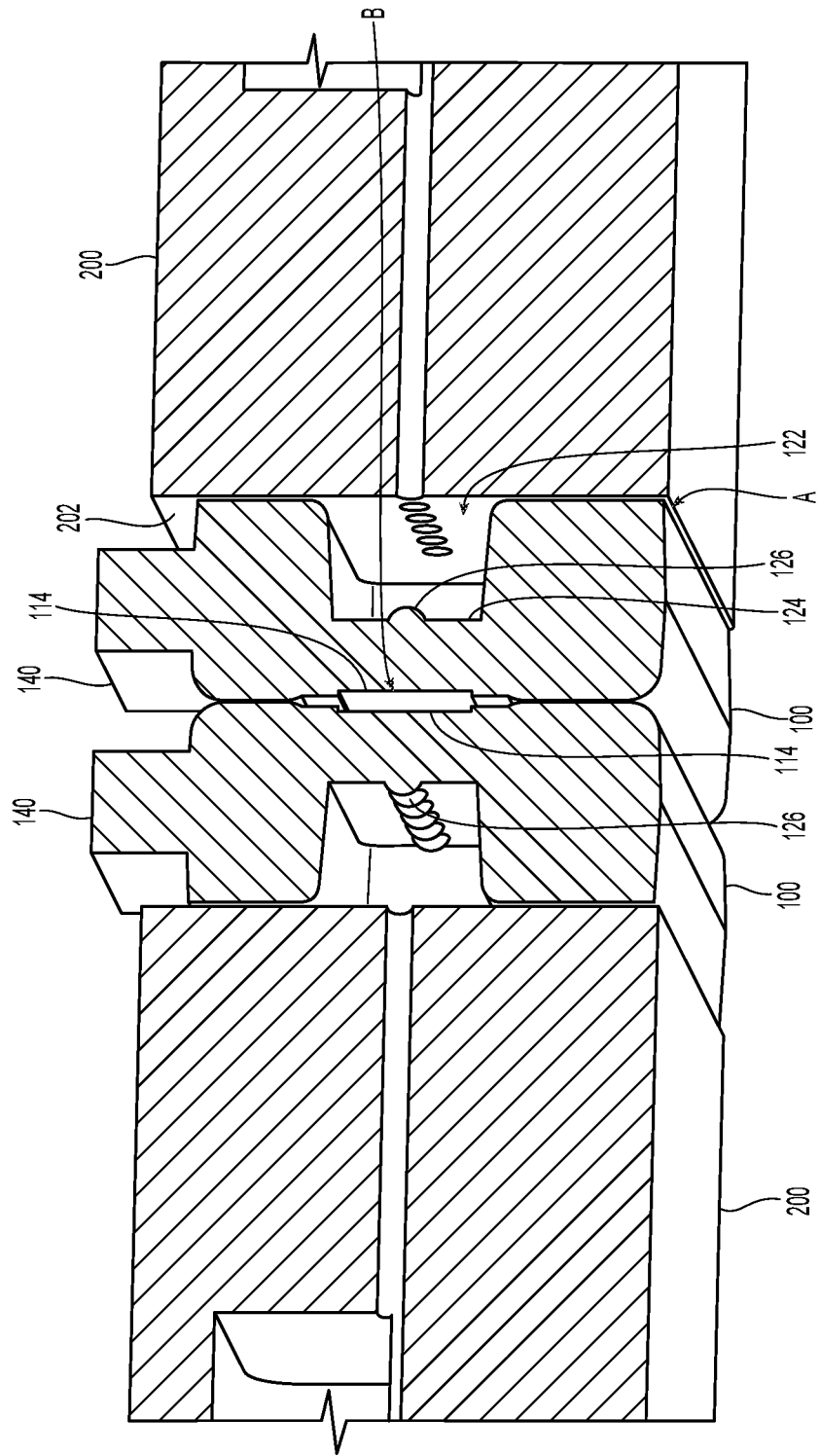
FIG. 8 is a partial view of a cross section of the two fiber-optic ferrules and two lens plates of FIG. 7 along the lines 8-8.
Figure 9:
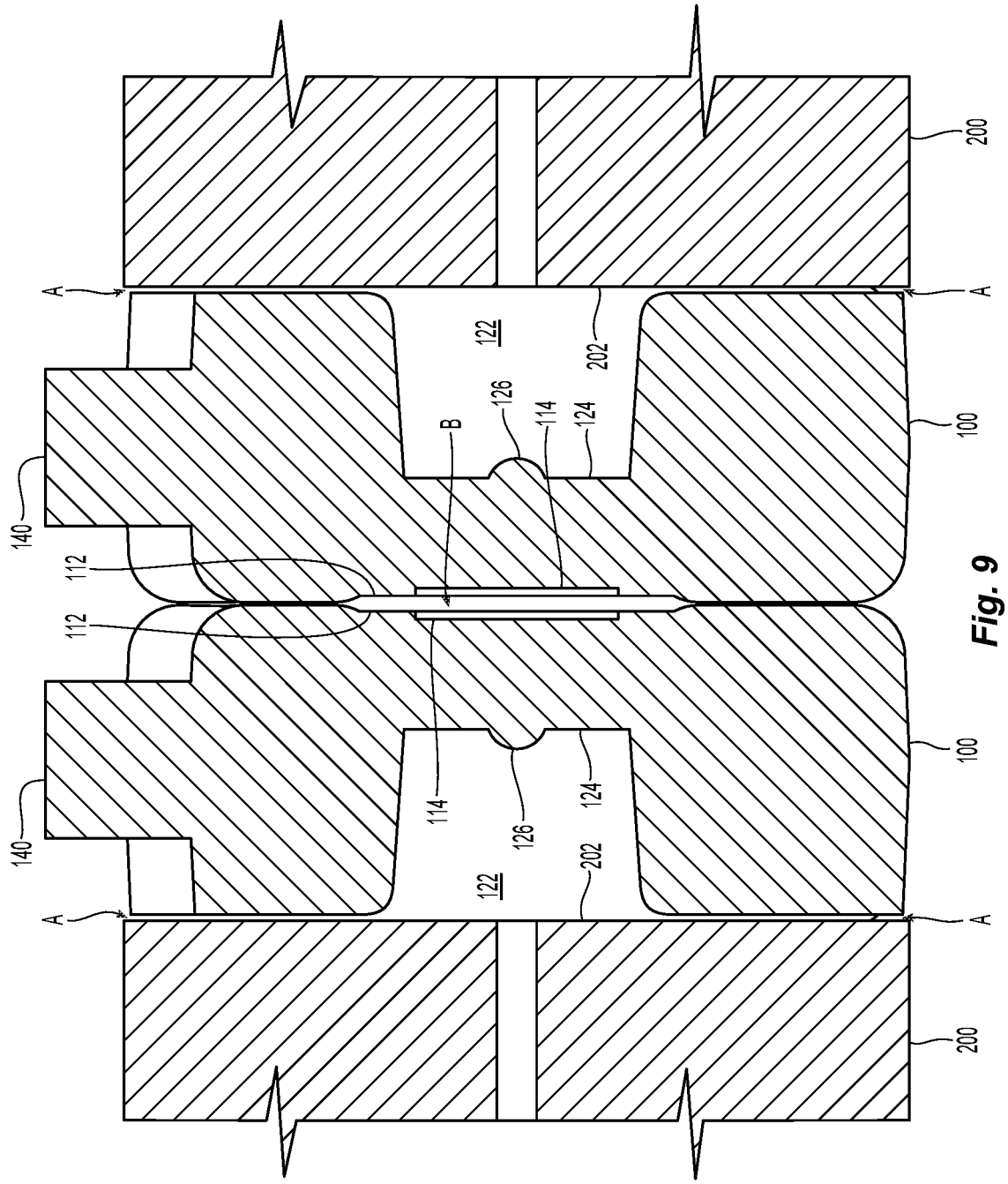
FIG. 9 is an elevation view of the a cross section view in FIG. 8.
Figure 10:
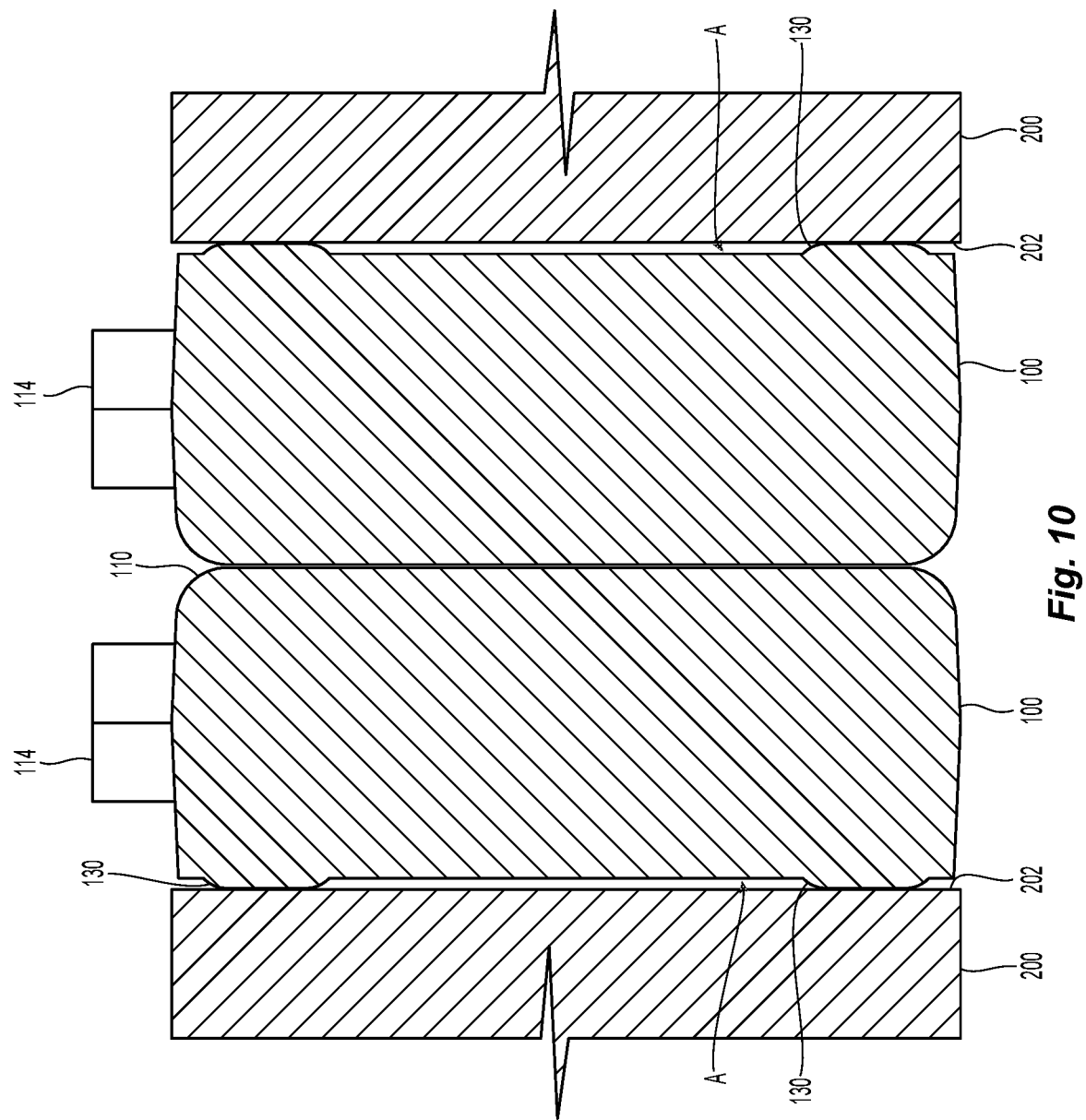
FIG. 10 is a partial view of a cross section of the two fiber-optic ferrules and two lens plates of FIG. 7 along the lines 10-10.

FIGS. 7-10 illustrate two mated fiber optic ferrules 200 with a lens plate 100 on each of the fiber optic ferrules 200 and the relationships of the components to one another. FIGS. 8-10 are cross section of the mated fiber optic ferrules 200 and show the spacing between the lens plates 100. For example, arrow A points to the spacing between the fiber optic ferrule end face 202 and outer face 110 of the outer side 104. This spacing is, as noted above, the same as the distance as the standoff members 130 extend from the inner face 120. Arrow B points to the space between the outer bases 114 of the two lens plates 100. This area between the outer bases 114 is where the optical beams are collimated as they pass between the fiber optic ferrules 200.

Figure 11:
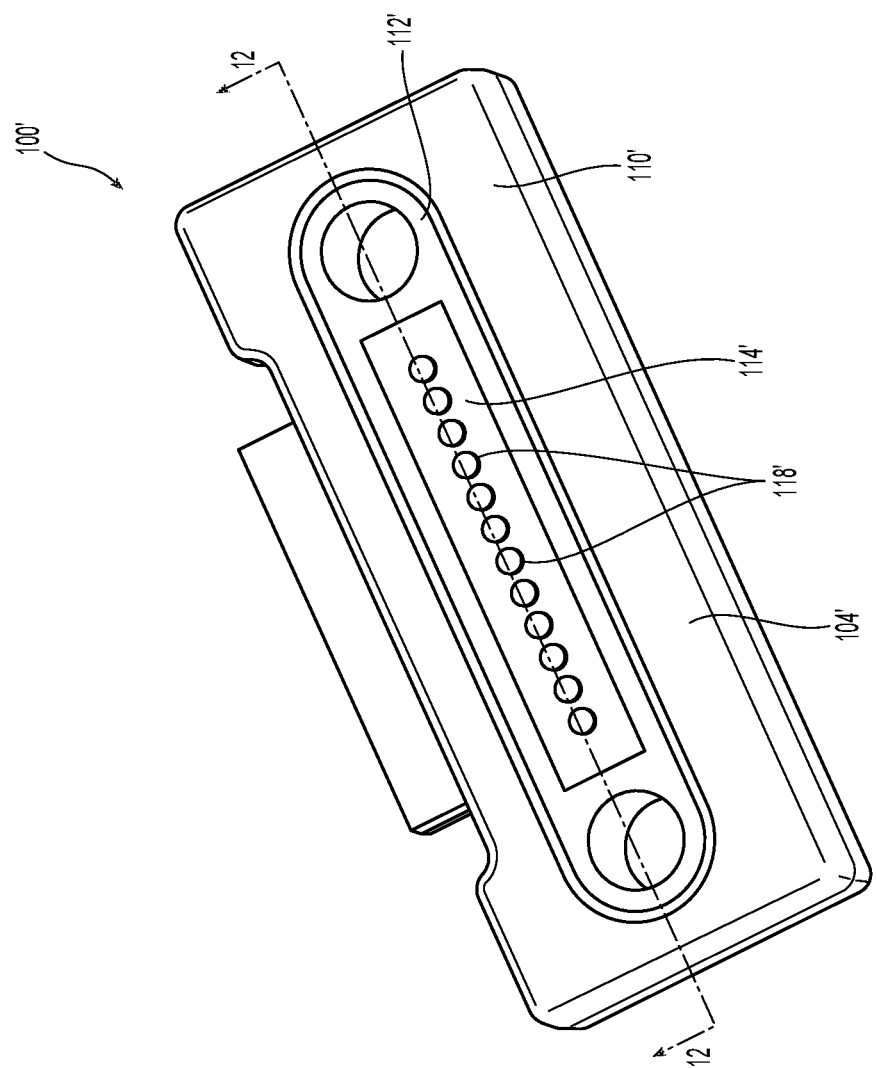
FIG. 11 is a perspective view of an outer side of another embodiment of a lens plate according to the present invention.
Figure 12:
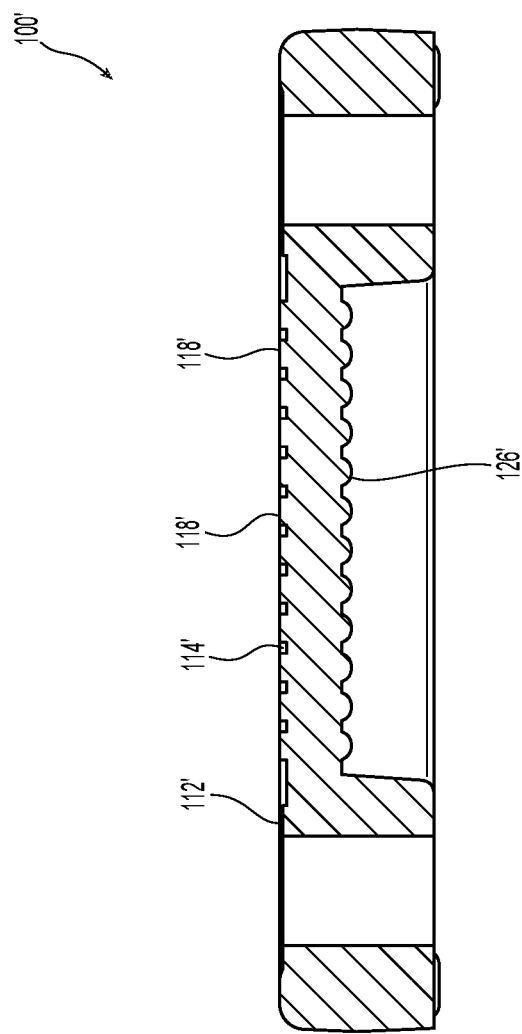
FIG. 12 is a plan view of a cross section of the lens plate of FIG. 11 along the lines 12-12.

An alternative embodiment of a lens plate 100' according to the present invention is illustrated in FIGS. 11 and 12. In this embodiment, the lens plate 100' has an outer side 104' that includes an outer face 110' that circumscribes an outer central recessed portion 112'. The outer face 110' is illustrated as completely circumscribing the entirety of the outer central recessed portion 112', but as noted above the outer face 110' may circumscribe less than the whole. The outer side 104' also has an outer base 114' that is contained within an outer central recessed portion 112'. The outer base 114' may also have a plurality of collimating lens pedestals 118'. The plurality of lens pedestals 118' may be extensions of the plurality of lenses 126'. Alternatively, the plurality of lens pedestals 118' may be separately molded. The diameter the plurality of pedestals 118' may generally correspond to a diameter or cross-section of the plurality of lenses 126'. The plurality of pedestals 118' may have a convex end surface that mates with opposing ones of the plurality of pedestals 118' in the clearance space. A height of the plurality of pedestals 118' may (measured from the outer base 114') determines whether the convex end face of the plurality of pedestals 118' will make contact with a mating pedestal from the opposing lens plate 100'. This structure would eliminate the need for an AR coating on the outer base 114', but would require the outer base remain clean to have physical contact of these structures.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:
1. A lens plate for a fiber-optic ferrule comprising:
a main body having an outer side and an inner side;
the outer side configured to mate with another lens plate or another fiber optic ferrule and facing in a direction opposite the inner side; and
the inner side having a plurality of lenses on an inner base in an inner central recessed portion of the inner side, the inner side facing an end face of the fiber-optic ferrule, and
a tab integrally formed along a top edge of the lens plate to aid in handling the lens plate;
wherein at least one of the plurality of lenses are configured to collimate an optical beam received thereupon, and
wherein an adhesive is applied to the inner side between the inner side and the end face of the fiber-optic ferrule to attach the lens plate to the fiber optic ferrule, and wherein the inner side has an inner face and the inner central recessed portion is fully circumscribed by the inner face without any openings when the lens plate is attached to the fiber-optic ferrule.

2. The lens plate according to claim 1, further comprising a standoff member extending from the inner face for engagement with the end face of the fiber-optic ferrule to allow for a space for the adhesive to fit between the end face and the inner face of the lens plate.

3. The lens plate according to claim 1, further comprising an outer base in an outer central recessed portion on the outer side and at least partially circumscribed by an outer face, the inner central recessed portion and the outer central recessed portion at least partially overlie one another.

4. The lens plate according to claim 3, wherein the outer central recessed portion is recessed about 50 microns.

5. The lens plate according to claim 1, wherein each of the plurality of lenses have prescription and the prescription of each of the plurality of lenses is the same.

6. The lens plate according to claim 1, wherein each of the plurality of lenses have prescription and the prescription of at least one of the plurality of lenses is different from the other of the plurality of lenses.

7. The lens plate according to claim 1, further comprising at least one guide pin hole passing through the main body and each of the inner face and the outer face to receive at least a portion of a guide pin associated with the fiber-optic ferrule.

8. The lens plate according to claim 1, wherein the inner side is connected to the end face of the fiber-optic ferrule.

9. A combination of a fiber-optic ferrule and a lens plate, comprising:
a fiber optic ferrule having an end face through which at least one optical beam passes;
a lens plate positioned forward of the end face of the fiber-optic ferrule;
a tab integrally formed at a top edge of the lens plate to aid in handling the lens plate; and
a cured adhesive between an inner side of the lens plate and the end face of the fiber-optic ferrule,
wherein the inner side has an inner face facing the end face of the fiber-optic ferrule when attached, and the inner face having a plurality of collimating lenses on an inner base in an inner central recessed portion of the inner side.

10. The lens plate according to claim 9, wherein the inner face at least partially circumscribing the inner central recessed portion and further comprising a further comprising a standoff member extending from the inner face for engagement with the end face of the fiber-optic ferrule.

11. The lens plate according to claim 9, further comprising an outer base in an outer central recessed portion on the outer side and at least partially circumscribed by an outer face, the inner central recessed portion and the outer central recessed portion at least partially overlie one another.

12. The lens plate according to claim 11, wherein the outer central recessed portion is recessed about 50 microns.

13. The lens plate according to claim 9, wherein each of the plurality of lenses have a prescription and the prescription of each of the plurality of lenses is the same.

14. The lens plate according to claim 9, wherein each of the plurality of lenses have prescription and the prescription of at least one of the plurality of lenses is different from the other of the plurality of lenses.

15. The lens plate according to claim 9, further comprising at least one guide pin hole passing through the lens plate and each of an inner face and an outer face to receive at least a portion of a guide pin associated with the fiber-optic ferrule.

16. The lens plate according to claim 9, wherein the inner central recessed portion is fully enclosed when the lens plate is attached to the fiber-optic ferrule.

* * * * *